US011809233B2

(12) United States Patent
Hou et al.

(10) Patent No.: US 11,809,233 B2
(45) Date of Patent: Nov. 7, 2023

(54) FLEXIBLE SCREEN SUPPORT DEVICE AND FLEXIBLE DISPLAY TERMINAL

(71) Applicant: KunShan Go-Visionox Opto-Electronics Co., Ltd., Jiangsu (CN)

(72) Inventors: Hongqi Hou, Kunshan (CN); Fu Liao, Kunshan (CN); Zhaoji Zhu, Kunshan (CN); Liwei Ding, Kunshan (CN); Kanglong Sun, Kunshan (CN); Yuhua Wu, Kunshan (CN)

(73) Assignee: KunShan Go-Visionox Opto-Electronics Co., Ltd., Kunshan (CN)

( * ) Notice: Subject to any disclaimer, the term of this patent is extended or adjusted under 35 U.S.C. 154(b) by 0 days.

(21) Appl. No.: 17/746,578

(22) Filed: May 17, 2022

(65) Prior Publication Data

US 2022/0276675 A1    Sep. 1, 2022

Related U.S. Application Data

(63) Continuation of application No. PCT/CN2021/081737, filed on Mar. 19, 2021.

(30) Foreign Application Priority Data

May 13, 2020 (CN) .......................... 202010402963.X

(51) Int. Cl.
*G06F 1/16* (2006.01)

(52) U.S. Cl.
CPC .......... *G06F 1/1652* (2013.01); *G06F 1/1618* (2013.01); *G06F 1/1624* (2013.01); *G06F 1/1681* (2013.01)

(58) Field of Classification Search
CPC .... G06F 1/1652; G06F 1/1618; G06F 1/1624; G06F 1/1681; G09F 9/301
See application file for complete search history.

(56) References Cited

U.S. PATENT DOCUMENTS 9,173,288 B1 * 10/2015 Kim ...................... G06F 1/1681
9,348,450 B1 *  5/2016 Kim .................... H04M 1/0268
(Continued)

FOREIGN PATENT DOCUMENTS

| CN | 103985315 A | 8/2014 |
| CN | 106910427 A | 6/2017 |

(Continued)

OTHER PUBLICATIONS

PCT International Search Report for International Application No. PCT/CN2021/081737 dated Jun. 18, 2021.
(Continued)

*Primary Examiner* — Rockshana D Chowdhury
(74) *Attorney, Agent, or Firm* — Rimon PC

(57) ABSTRACT

A flexible screen support device and a flexible display terminal are provided. The flexible screen support device includes: a rotating assembly including a rotation shaft; a first housing and a second housing respectively connected to the rotating assembly; and a fixing piece, located on one side, away from the rotating assembly, of the first housing and the second housing. At least one of the first housing and the second housing rotates around the rotating assembly to make the fixing piece bend or flatten, and a horizontal length of a side surface, perpendicular to the rotation shaft, of the fixing piece in a flattened state is equal to a length of the side surface, which is a curved surface, of the fixing piece in a bent state.

20 Claims, 5 Drawing Sheets

(56) References Cited

U.S. PATENT DOCUMENTS

| | | | | |
|---|---|---|---|---|
| 9,811,119 | B2* | 11/2017 | Seo | H04M 1/0268 |
| 10,306,788 | B2* | 5/2019 | Bi | H04M 1/0214 |
| 10,327,346 | B2* | 6/2019 | Zhang | H05K 5/0226 |
| 10,481,634 | B2* | 11/2019 | Mizoguchi | G06F 1/1616 |
| 11,360,590 | B2* | 6/2022 | Jinbo | G06F 1/1641 |
| 2012/0307423 | A1* | 12/2012 | Bohn | H04M 1/0216 |
| | | | | 361/679.01 |
| 2014/0003006 | A1* | 1/2014 | Ahn | G06F 1/1679 |
| | | | | 361/749 |
| 2015/0089974 | A1* | 4/2015 | Seo | A44C 5/0076 |
| | | | | 63/1.13 |
| 2016/0299532 | A1* | 10/2016 | Gheorghiu | H04B 1/3888 |
| 2021/0311525 | A1* | 10/2021 | Seo | G06F 1/1679 |

FOREIGN PATENT DOCUMENTS

| | | |
|---|---|---|
| CN | 207115888 U | 3/2018 |
| CN | 107887696 A | 4/2018 |
| CN | 108461519 A | 8/2018 |
| CN | 208421694 U | 1/2019 |
| CN | 208806016 U | 4/2019 |
| CN | 109830185 A | 5/2019 |
| CN | 110473468 A | 11/2019 |
| CN | 209949164 U | 1/2020 |
| CN | 210041890 U | 2/2020 |
| CN | 111489650 A | 8/2020 |
| KR | 20200049975 A | 5/2020 |
| WO | 2019054839 A1 | 3/2019 |

OTHER PUBLICATIONS

PCT Written opinion for International Application No. PCT/CN2021/081737 dated Jun. 18, 2021.

Chinese first office action for application No. 202010402963.X dated Aug. 27, 2021.

* cited by examiner

FLEXIBLE SCREEN SUPPORT DEVICE AND FLEXIBLE DISPLAY TERMINAL

CROSS-REFERENCE TO RELATED APPLICATIONS

This application is a continuation of International Application No. PCT/CN2021/081737, filed on Mar. 19, 2021, which claims priority to Chinese Patent Application No. 202010402963.X, filed on May 13, 2020. The disclosures of the aforementioned applications are hereby incorporated by reference in their entireties.

TECHNICAL FIELD

The present disclosure relates to the field of flexible display technologies, and in particular, to a flexible screen support device and a flexible display terminal.

BACKGROUND

With the development of flexible display technologies, a flexible display screen is gradually applied to various display terminals. Such a display terminal with a flexible display screen is referred to as a flexible display terminal for short. In the prior art, in order to ensure that a flexible display terminal may present a folded state and a flattened state, a flexible screen support device is usually needed to be fixed on a lower surface of a flexible display screen. In this case, when a flexible display terminal is folded, the flexible display screen may be squeezed or stretched by the flexible screen support device, thereby causing display failure of the flexible display screen.

SUMMARY

In view of this, embodiments of the present disclosure aim to provide a flexible screen support device and a flexible display terminal, to resolve a problem of display failure of a flexible display screen in the prior art caused when the flexible display screen is squeezed or stretched by a flexible screen support device in a bent state.

A first aspect of the present disclosure provides a flexible screen support device, including: a rotating assembly comprising a rotation shaft; a first housing and a second housing which are respectively connected to the rotating assembly; and a fixing piece, located on one side, away from the rotating assembly, of the first housing and the second housing. At least one of the first housing and the second housing rotates around the rotating assembly to make the fixing piece bend or flatten. And a horizontal length of a side surface, perpendicular to the rotation shaft, of the fixing piece in a flattened state is equal to a length of the side surface, which is a curved surface, of the fixing piece in a bent state.

A second aspect of the present disclosure provides a flexible display terminal, including: a flexible screen support device provided in any one of the foregoing embodiments; a flexible display screen, fixed on one side, away from the rotating assembly, of the fixing piece; and a central control circuit board, electrically connected to the flexible display screen.

According to the flexible screen support device provided in the embodiments, a fixing piece is disposed in a bent region between a first housing and a second housing, and a horizontal length of a side surface, perpendicular to a rotation shaft, of the fixing piece in a flattened state is equal to a length of the side surface, which is a curved surface, of the fixing piece in a bent state, that is, the fixing piece is not stretched in a bent state. In this case, a flexible display screen which is subsequently stacked on the fixing piece cannot be squeezed or stretched by the flexible screen support device.

DETAILED DESCRIPTION

In order to make objectives, technical means and advantages of the present application clearer, a further detailed description on the present application will be given below in combination with accompanying drawings.

An embodiment of the present application provides a flexible screen support device. The flexible screen support device is configured to support a flexible display screen, and drive the flexible display screen to bend and flatten. The flexible screen support device is provided with a fixing piece at a position corresponding to a bent region of the flexible display screen, and the flexible display screen is stacked on the fixing piece. The fixing piece is an element which may be bent after a stress but not stretched or shrunk. In other words, the fixing piece is equivalent to a bending neutral layer, that is, the fixing piece is not stretched due to a bending stress during bending of the flexible screen support device. In this case, it may be ensured that the flexible display screen cannot be squeezed or stretched by the flexible screen support device.

A structure of a flexible screen support device provided in the present application will be described in detail below with reference to specific embodiments.

Figure 1:
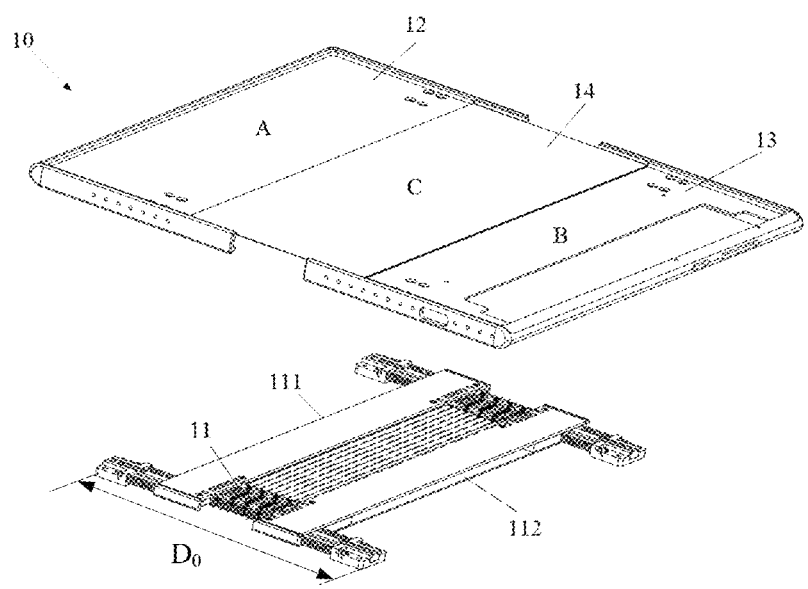
FIG. 1 is an exploded structural diagram of a flexible screen support device according to an embodiment of the present application.

FIG. 1 is an exploded structural diagram of a flexible screen support device according to an embodiment of the present application. The flexible screen support device 10 may be configured to support a flexible display screen, and drive the flexible display screen to bend and flatten. As shown in FIG. 1, the flexible screen support device 10 may include a first housing 12 and a second housing 13 which are respectively connected to a rotating assembly 11. The flexible screen support device 10 may further include a fixing piece 14. The fixing piece 14 may be located on one side, away from the rotating assembly 11, of the first housing 12 and the second housing 13. At least one of the first housing 12 and the second housing 13 may rotate around the rotating assembly 11 to make the fixing piece 14 bent or flatten. A horizontal length of a side surface, perpendicular to a rotation shaft, of the fixing piece 14 in a flattened state is equal to a length of the side surface, which is a curved surface, of the fixing piece 14 in a bent state.

The first housing 12 and the second housing 13 may respectively include a first side and a second side which are oppositely disposed, and the rotating assembly 11 may be respectively connected to the first side of the first housing 12 and the first side of the second housing 13. The fixing piece 14 may be located on the second side of the first housing 12 and the second housing 13. In the flattened state, the fixing piece 14 may include a side surface perpendicular to the rotation shaft. In this case, the side surface is a plane, and a length of the side surface in a direction perpendicular to the rotation shaft is a first length. In the bent state, the side surface of the fixing piece 14 is a curved surface. In this case, a curved length of the side surface is a second length. The second length is equal to the first length, that is, the length of the side surface of the fixing piece 14 is not stretched or squeezed before and after bending.

In an embodiment, on a side away from the rotating assembly 11, a spacing may be formed between the first housing 12 and the second housing 13, and the fixing piece 14 may be fixed between the first housing 12 and the second housing 13, and the fixing piece 14 covers the spacing. That is, the fixing piece 14 may be located between the first housing 12 and the second housing 13, and connected to the first housing 12 and the second housing 13, respectively. The fixing piece 14 and the rotating assembly 11 are stacked.

Specifically, the rotating assembly 11 may include a first end 111 and a second end 112 which are symmetrical with respect to the rotation shaft. The first end 111 is elastically connected to the first housing 12, and the second end 112 is elastically connected to the second housing 13. Two opposite sides of the fixing piece 14 are fixedly connected to the first housing 12 and the second housing 13 respectively, and the fixing piece 14 is stacked on the rotating assembly 11. Based on a bending characteristic of the fixing piece 14, when the first housing 12 and the second housing 13 rotate around the rotating assembly 11, the first housing 12 and the second housing 13 may respectively drive two sides of the fixing piece 14 to move toward each other, thus the fixing piece 14 can be bent, or the first housing 12 and the second housing 13 may respectively drive the two sides of the fixed piece 14 to move away from each other, thus the fixing piece 14 can be flattened.

Figure 2:
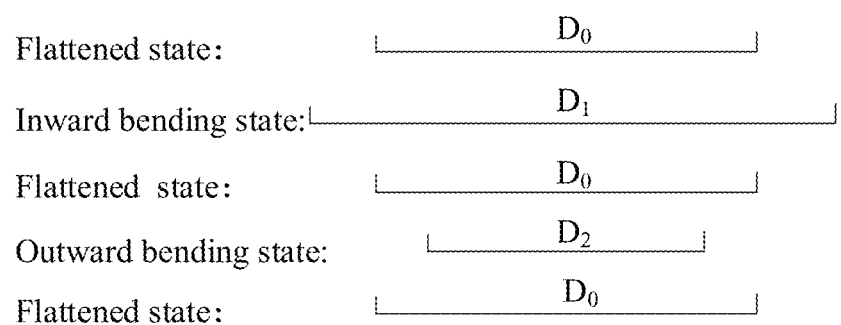
FIG. 2 is a schematic diagram of length variations of a rotating assembly during state switching of the flexible screen support device shown in FIG. 1.

FIG. 2 is a schematic diagram of length variations of a rotating assembly during state switching of the flexible screen support device shown in FIG. 1. Referring to FIG. 1 and FIG. 2, when the flexible screen support device 10 is in a flattened state, a line length of the rotating assembly 11 is Do. The line length is a length in a direction perpendicular to the rotation shaft, and the following is the same.

When a user exerts acting force on the first housing 12 and the second housing 13 respectively, to push the first housing 12 and the second housing 13 to rotate around the rotating assembly 11 upward in a direction parallel to the rotation shaft, the fixing piece 14 is not stretched due to bending because the fixing piece 14 is equivalent to a bending neutral layer. The rotating assembly 11, away from a bending direction, located in the bending neutral layer is subjected to a stretching stress, and the stretching stress drives the first housing 12 and the second housing 13 to respectively move toward two sides away from the rotating assembly 11. In the meantime, the first housing 12 drives one side of the fixing piece 14 to move clockwise, and the second housing 13 drives the other side of the fixing piece 14 to move counterclockwise, so that the fixing piece 14 may be bent upward, which is equivalent to inward bending of the flexible display screen. When the first housing 12 and the second housing 13 are face to face, the fixing piece 14 may have a maximum degree of bending. In this case, the line length of the rotating assembly 11 is Di.

Based on the above situation, when a user exerts acting force on the first housing 12 and the second housing 13 respectively, to push the first housing 12 and the second housing 13 to rotate around the rotating assembly 11 downward, the first housing 12 and the second housing 13 respectively move in a direction close to the rotating assembly 11. The first housing 12 drives one side of the fixing piece 14 to move counterclockwise, and the second housing 13 drives the other side of the fixing piece 14 to move clockwise, so that the fixing piece 14 is in a flattened state. In this case, the line length of the rotating assembly 11 is restored to Do.

Based on the above situation, when a user continues to exert acting force on the first housing 12 and the second housing 13 respectively, to push the first housing 12 and the second housing 13 to rotate around the rotating assembly 11 downward, the fixing piece 14 is not stretched due to bending because the fixing piece 14 is equivalent to a bending neutral layer. The rotating assembly 11 is subjected to a compression stress, and the compression stress drives the first housing 12 and the second housing 13 to respectively move in a direction close to the rotating assembly 11. In the meantime, the first housing 12 drives one side of the fixing piece 14 to move counterclockwise, and the second housing 13 drives the other side of the fixing piece 14 to move clockwise, so that the fixing piece 14 may be bent downward, which is equivalent to outward bending of the flexible display screen. When the first housing 12 and the second housing 13 are face to face, the fixing piece 14 may have a maximum degree of bending. In this case, the line length of the rotating assembly 11 is $D_z$.

Based on the above situation, when a user exerts acting force on the first housing 12 and the second housing 13 respectively, to push the first housing 12 and the second housing 13 to rotate around the rotating assembly 11 upward, the first housing 12 and the second housing 13 respectively move in a direction away from the rotating assembly 11. The first housing 12 drives one side of the fixing piece 14 to move clockwise, and the second housing 13 drives the other side of the fixing piece 14 to move counterclockwise, so that the fixing piece 14 is in a flattened state. In this case, the line length of the rotating assembly 11 is restored to Do.

The first housing 12 and the second housing 13 may alternatively be connected through a telescopic member, for example, a telescopic rod, or another distance adjusting member, as long as a distance variation between the rotating assembly 11 and at least one of the first housing 12 and the second housing 13 can be implemented when the first housing 12 and the second housing 13 rotate around the rotating assembly 11.

According to the flexible screen support device provided in the embodiments, a fixing piece is disposed in a bent region between a first housing and a second housing. Since the fixing piece is not stretched during bending, that is, the fixing piece is equivalent to a bending neutral layer of the flexible screen support device. In this case, a flexible display screen that is subsequently stacked on the fixing piece cannot be squeezed or stretched by the flexible screen support device.

In an embodiment, the fixing piece 14 may include a steel piece. A shape of the fixing piece 14 may be properly set according to actual requirements, for example, in this embodiment, the fixing piece 14 may be plate-shaped.

In an embodiment, as shown in FIG. 1, a first screen support surface A, a second screen support surface B, and a third screen support surface C may be coplanar when the fixing piece 14 is in a flattened state.

In this case, the first screen support surface A, the second screen support surface B and the third screen support surface C integrally form a support surface of a flexible display screen. The support surface is always in a continuous connection state, that is, one side edge of the first screen support surface A is in contact with one side edge of the third screen support surface C, and the other side edge of the third screen support surface C is in contact with one side edge of the second screen support surface B. The flexible display screen may be directly adhered to the support surface subsequently. The flexible display screen may be supported with a flat and complete surface to ensure that the flexible display screen has a good display effect.

In an embodiment, as shown in FIG. 1, the rotating assembly 11 has a rotation angle of 360 degrees, that is, when the rotation shaft is used as a symmetry axis, two ends of the rotating assembly 11 may be bent in two opposite directions. For example, both ends of the rotating assembly 11 may be bent upward and downward, respectively. In this case, the support surface integrally formed by the first screen support surface A, the second screen support surface B, and the third screen support surface C is equivalent to a bending neutral layer of the flexible screen support device 10. Therefore, in any state where a rotation angle of the rotating assembly 11 is within the range of 360 degrees, the flexible display screen stacked on the support surface cannot be squeezed or stretched by the flexible screen support device 10.

In an embodiment, as shown in FIG. 1, the rotating assembly may include a rotation shaft in a form of a chain. The rotation shaft in the form of a chain may be specifically implemented by using a form in the prior art, such as a watch chain structure. The rotation shaft in the form of a chain may be configured to implement a rotation angle of 360 degrees, and always provide support for a bent region of the flexible display screen during bending, so as to reduce a risk of damage to the flexible display screen and to improve reliability.

In an embodiment, the rotating assembly may include a first end and a second end which are symmetrical with respect to the rotation shaft. The first housing and the second housing are respectively connected to the first end and the second end by using elastic members. Each of the first end and the second end is provided with a limiting member corresponding to the elastic member, and the limiting member is configured to limit a stretch direction of the elastic member to a straight-line direction.

For example, as shown in FIG. 1, the rotating assembly 11 may include a first end 111 and a second end 112 which are symmetrical with respect to the rotation shaft. The first housing 12 and the second housing 13 are slidably connected to the first end 111 and the second end 112, respectively. The flexible screen support device 10 may further include at least two elastic members respectively disposed between the first end 111 and the first housing 12 and between the second end 112 and the second housing 13. A stretch direction of the elastic member is perpendicular to the rotation shaft of the rotating assembly 11.

Figure 3:
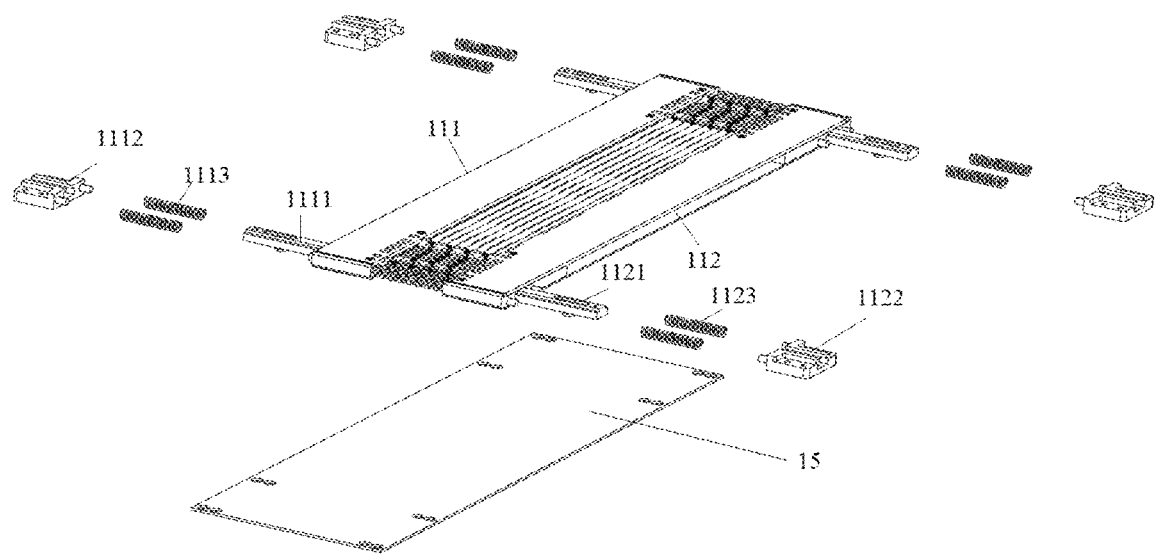
FIG. 3 is a partially exploded view of the flexible screen support device shown in FIG. 1 according to an embodiment of the present application.

Specifically, FIG. 3 is a partially exploded view of the flexible screen support device shown in FIG. 1 according to an embodiment of the present application. Referring to FIG. 1 and FIG. 3, the first end 111 and the second end 112 of the rotating assembly 11 are provided with a first sliding rail 1111 and a second sliding rail 1121, respectively. The first housing 12 includes a first slider 1112 in a sliding fit with the first end 111, and the second housing 13 includes a second slider 1122 in a sliding fit with the second end 112. The at least two elastic members may include a first spring 1113 connected between the first slider 1112 and the first end 111 and a second spring 1123 connected between the second slider 1122 and the second end 112, respectively.

For example, as shown in FIG. 3, the first sliding rail 1111 may include a first base and a first protrusion disposed on the first base. The first slider 1112 may include a second base and a first groove disposed on the second base, and the first groove is in a sliding fit with the first protrusion. Two sides of the first protrusion are provided with a first spring 1113, respectively, and two ends of each first spring 1113 are respectively connected to the first slider 1112 and the first end 111 of the rotating assembly 11. The second slide rail 1121 may include a third base and a second protrusion disposed on the third base. The second slider 1122 may include a fourth base and a second groove disposed on the fourth base, and the second groove is in a sliding fit with the second protrusion. Two sides of the second protrusion are provided with a second spring 1123, respectively, and two ends of each second spring 1123 are respectively connected to the second slider 1122 and the second end 112 of the rotating assembly 11.

In another embodiment, the first sliding rail 1111 and the second sliding rail 1121 may alternatively be disposed on the first housing 12 and the second housing 13, respectively. Accordingly, the first slider 1112 and the second slider 1122 may be disposed at the first end 111 and the second end 112 of the rotating assembly 11, respectively.

According to the flexible screen support device 10 provided in the embodiments, it may be ensured that the first spring 1113 and the second spring 1123 can stretch in a direction parallel to the first housing 12 and the second housing 13, respectively, so as to ensure that the first housing 12 and the second housing 13 move synchronously, thereby avoiding distortion of a display surface of the flexible display screen.

In an embodiment, as shown in FIG. 3, the flexible screen support device 10 may further include a cover plate 15 fixedly connected to the first housing 12 and the second housing 13, respectively, and the cover plate is located on one side, away from the fixing piece 14, of the rotating assembly 11. In this embodiment, the cover plate may include an elastic region, and an orthographic projection of the rotating assembly 11 on the cover plate falls in the elastic region. Alternatively, the cover plate may include a central region, and a first edge region and a second edge region which are slidably connected to two opposite sides of the central region, respectively; and an orthographic projection of the rotating assembly 11 on the cover plate falls in the central region.

The cover plate, the first housing 12, the second housing 13, and the fixing piece 14 together form an outer housing of the flexible screen support device 10, thereby providing protection for the rotating assembly 11 inside the flexible screen support device 10.

An embodiment of the present application further provides a flexible display terminal, including: the flexible screen support device 10 provided in any one of the foregoing embodiments; a flexible display screen, fixed on one side, away from the rotating assembly, of the fixing piece 14; and a central control circuit board, electrically connected to the flexible display screen. The central control circuit board is configured to control the flexible display screen to implement a display function.

In an embodiment, the rotating assembly 11 may include a rotation shaft in a form of a chain. The rotation shaft in the form of a chain may include a plurality of synchronous rotation shafts, and a radius of each of the synchronous rotation shafts is dependent on a thickness and an inward bending radius of the flexible display screen.

Figure 4A:
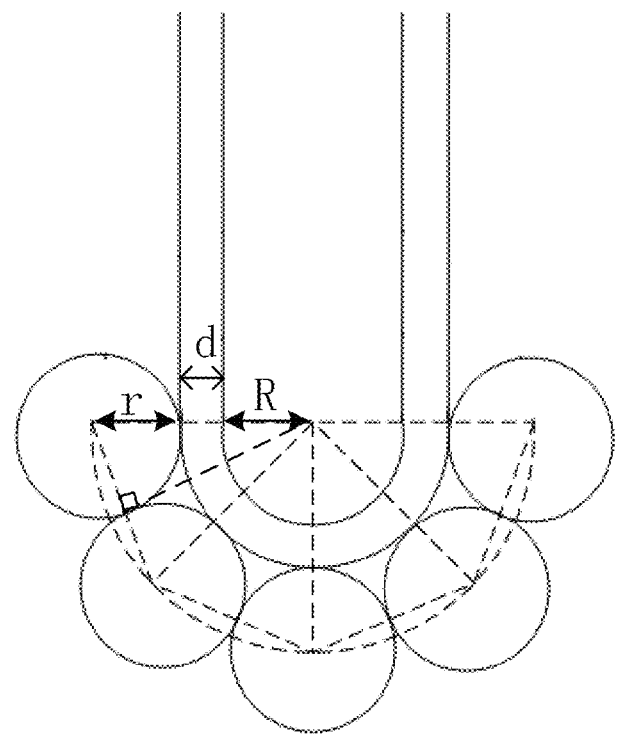
FIG. 4a is a schematic cross-sectional view of a flexible display terminal according to a first embodiment of the present application.
Figure 4B:
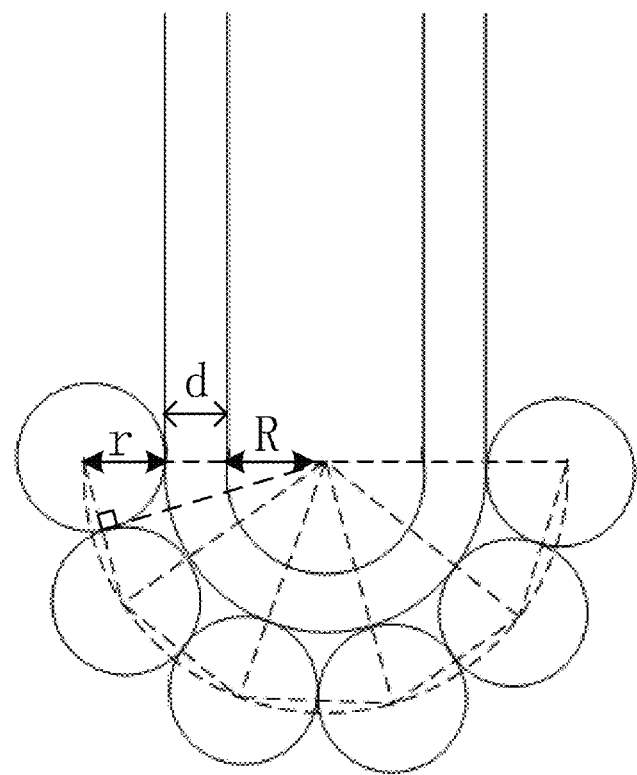
FIG. 4b is a schematic cross-sectional view of a flexible display terminal according to a second embodiment of the present application.

Specifically, FIG. 4a is a schematic cross-sectional view of a flexible display terminal according to a first embodiment of the present application. FIG. 4b is a schematic cross-sectional view of a flexible display terminal according to a second embodiment of the present application. It can be seen in combination with FIG. 4a and FIG. 4b that, the number of the synchronous rotation shafts included in the rotation shaft in the form of a chain may be odd or even. When the number n of the synchronous rotation shafts included in the rotation shaft in the form of a chain is determined, a radius of each synchronous rotation shaft may be calculated based on the formula: $r=(R+d)/[\arcsin(180°/2(n-1)-1]$, where R denotes an inward bending radius of the flexible display screen, and d denotes a thickness of the flexible display screen.

For example, referring to FIG. 4a, when the number of the synchronous rotation shafts is 5, a radius of each synchronous rotation shaft may be calculated based on the formula: $r=(R+d)/[\arcsin(180°/2(n-1)-1]=(R+d)/[\arcsin 22.5°-1]$.

For another example, referring to FIG. 4b, when the number of the synchronous rotation shafts is 6, a radius of each synchronous rotation shaft may be calculated based on the formula: $r=(R+d)/[\arcsin(180°/2(n-1)-1]=(R+d)/[\arcsin 18°-1]$.

The foregoing descriptions are merely preferred embodiments of the present application, but are not intended to limit the present application. Any modification, equivalent replacement, and the like made without departing from the spirit and principle of the present application shall fall within the protection scope of the present application.

What is claimed is:

1. A flexible screen support device, comprising:
a rotating assembly comprising a rotation shaft;
a first housing and a second housing which are respectively connected to the rotating assembly; and
a fixing piece, located on one side, away from the rotating assembly, of the first housing and the second housing,
wherein at least one of the first housing and the second housing rotates around the rotating assembly to make the fixing piece bend or flatten, and a horizontal length of a side surface, perpendicular to the rotation shaft, of the fixing piece in a flattened state is equal to a length of the side surface, which is a curved surface, of the fixing piece in a bent state;
wherein a line length of the rotating assembly, the first housing and the second housing when the flexible screen support device is in the flattened state is different from a line length of the rotating assembly, the first housing and the second housing when the flexible screen support device is in the bent state.

2. The flexible screen support device according to claim 1, wherein a spacing is formed between the first housing and the second housing, and the fixing piece is fixed between the first housing and the second housing, and the fixing piece covers the spacing.

3. The flexible screen support device according to claim 2, wherein the first housing comprises a first screen support surface, the second housing comprises a second screen support surface, the fixing piece comprises a third screen support surface; and the first screen support surface, the second screen support surface and the third screen support surface are coplanar when the fixing piece is in the flattened state.

4. The flexible screen support device according to claim 1, wherein the rotating assembly has a rotation angle of 360 degrees.

5. The flexible screen support device according to claim 1, wherein the rotation shaft is in a form of a chain, and the rotation shaft is configured to implement a rotation angle of 360 degrees.

6. The flexible screen support device according to claim 1, wherein the rotating assembly comprises a first end and a second end which are symmetrical with respect to the rotation shaft; the first housing and the second housing are respectively connected to the first end and the second end by elastic members; each of the first end and the second end is provided with a limiting member corresponding to the elastic member, and the limiting member is configured to limit a stretch direction of the elastic member to a straight-line direction.

7. The flexible screen support device according to claim 1, wherein the rotating assembly comprises a first end and a second end which are symmetrical with respect to the rotation shaft, and the first housing and the second housing are slidably connected to the first end and the second end, respectively; and
the rotating assembly further comprises at least two elastic members respectively located between the first end and the first housing and between the second end and the second housing, and a stretch direction of the elastic member is perpendicular to the rotation shaft of the rotating assembly.

8. The flexible screen support device according to claim 7, wherein the first end and the second end are respectively provided with a first sliding rail and a second sliding rail; the first housing comprises a first slider in a sliding fit with the first end, and the second housing comprises a second slider in a sliding fit with the second end; and the at least two elastic members comprise a first spring connected between the first slider and the first end and a second spring connected between the second slider and the second end, respectively.

9. The flexible screen support device according to claim 1, further comprising:
a cover plate fixedly connected to the first housing and the second housing respectively, wherein the cover plate is located on one side, away from the fixing piece, of the rotating assembly; and
the cover plate comprises an elastic region, and an orthographic projection of the rotating assembly on the cover plate is disposed within the elastic region.

10. The flexible screen support device according to claim 1, further comprising:
a cover plate fixedly connected to the first housing and the second housing respectively, wherein the cover plate is located on one side, away from the fixing piece, of the rotating assembly; and
the cover plate comprises a central region, and a first edge region and a second edge region which are connected to two opposite sides of the central region, respectively; and an orthographic projection of the rotating assembly on the cover plate is disposed within the central region.

11. The flexible screen support device according to claim 1, wherein the fixing piece comprises a steel piece.

12. The flexible screen support device according to claim 1, wherein the first housing and the second housing are connected through a telescopic member.

13. The flexible screen support device according to claim 1, wherein the fixing piece is plate-shaped.

14. A flexible display terminal, comprising:
a flexible screen support device according to claim 1;
a flexible display screen, fixed on the first housing and the second housing, and located on one side, away from the rotating assembly, of the fixing piece; and
a central control circuit board, electrically connected to the flexible display screen.

15. The flexible display terminal according to claim 14, wherein the rotation shaft is in a form of a chain, and the rotation shaft comprises a plurality of synchronous rotation shafts.

16. The flexible display terminal according to claim 15, wherein a radius of each of the synchronous rotation shafts is dependent on a thickness and an inward bending radius of the flexible display screen.

17. The flexible display terminal according to claim 16, wherein the radius of each of the synchronous rotation shafts is calculated based on a following formula:

$$r=(R+d)/[\arcsin(180°/2(n-1)-1]$$

wherein R denotes the inward bending radius of the flexible display screen, d denotes the thickness of the flexible display screen, and n denotes a quantity of the plurality of synchronous rotation shafts.

18. The flexible screen support device according to claim 1, wherein the bent state comprises an inward bending state, and a line length of the rotating assembly, the first housing and the second housing when the flexible screen support device is in the inward bending state is larger than the length of the rotating assembly, the first housing and the second housing when the flexible screen support device is in the flattened state.

19. The flexible screen support device according to claim 1, wherein the bent state comprises an outward bending state, and a line length of the rotating assembly, the first housing and the second housing when the flexible screen support device is in the outward bending state is smaller than the length of the rotating assembly, the first housing and the second housing when the flexible screen support device is in the flattened state.

20. The flexible screen support device according to claim 1, wherein the bent state comprises an inward bending state and an outward bending state, and a line length of the rotating assembly, the first housing and the second housing when the flexible screen support device is in the outward bending state is smaller than a length of the rotating assembly, the first housing and the second housing when the flexible screen support device is in the inward bending state.

* * * * *